(12) United States Patent
Yasuike

(10) Patent No.: US 8,440,293 B2
(45) Date of Patent: May 14, 2013

(54) LAMINATED TAPE, PACKAGE, AND PROCESS FOR PRODUCING LAMINATED TAPE

(75) Inventor: Tetsuro Yasuike, Sodegaura (JP)

(73) Assignee: Idemitsu Unitech Co., Ltd., Tokyo (JP)

( * ) Notice: Subject to any disclaimer, the term of this patent is extended or adjusted under 35 U.S.C. 154(b) by 636 days.

(21) Appl. No.: 12/306,553

(22) PCT Filed: Jun. 26, 2007

(86) PCT No.: PCT/JP2007/062796
§ 371 (c)(1),
(2), (4) Date: Dec. 24, 2008

(87) PCT Pub. No.: WO2008/001768
PCT Pub. Date: Jan. 3, 2008

(65) Prior Publication Data
US 2009/0252912 A1    Oct. 8, 2009

(30) Foreign Application Priority Data

Jun. 27, 2006 (JP) ................. 2006-177291

(51) Int. Cl.
*B32B 27/32* (2006.01)
*B32B 7/02* (2006.01)
*B32B 7/06* (2006.01)
*B32B 7/12* (2006.01)
*B29C 47/06* (2006.01)
*B65D 33/28* (2006.01)

(52) U.S. Cl.
USPC ........ 428/212; 428/40.1; 428/41.3; 428/42.2; 428/77; 428/189; 428/213; 428/500; 428/515; 428/516; 428/517; 428/523; 264/171.1; 264/176.1; 383/94; 383/95; 383/210; 383/211; 383/908

(58) Field of Classification Search ........... None
See application file for complete search history.

(56) References Cited

U.S. PATENT DOCUMENTS 4,872,562 A * 10/1989 Wyberg ................ 206/523
5,330,269 A *  7/1994 Kamada et al. ........... 383/210
(Continued)

FOREIGN PATENT DOCUMENTS
FR    2783512 A1 *  3/2000
GB    2370808 A  *  7/2002
(Continued)

OTHER PUBLICATIONS

Translation of JP 2000-202958 A, Jul. 2000.*
(Continued)

*Primary Examiner* — David Sample
*Assistant Examiner* — Jeff Vonch
(74) *Attorney, Agent, or Firm* — Millen, White, Zelano & Branigan, P.C.

(57) ABSTRACT

A laminated tape includes: an adhesive material layer; a first polyolefin layer provided on one side of the adhesive material layer; and a second polyolefin layer provided on the other side of the adhesive material layer. The laminated tape is sandwiched between opposing base films of a packaging body to be welded. The polyolefin used for the first polyolefin layer and the second polyolefin layer is of the same type. The thickness of the respective layers of the laminated tape is preferably defined so that the thickness of the first polyolefin layer and the adhesive material layer is 30 μm or more and the thickness of the second polyolefin layer is less than 30 μm.

9 Claims, 20 Drawing Sheets

U.S. PATENT DOCUMENTS

| | | | |
|---|---|---|---|
| 5,538,345 A * | 7/1996 | Gotoh et al. | 383/210 |
| 5,882,749 A | 3/1999 | Jones et al. | |
| 5,882,789 A * | 3/1999 | Jones et al. | 428/349 |
| 6,106,153 A * | 8/2000 | Toshima | 383/204 |
| 6,420,021 B1 * | 7/2002 | Seta et al. | 428/348 |
| 7,927,679 B2 * | 4/2011 | Cruz et al. | 428/40.1 |
| 2002/0023924 A1 * | 2/2002 | Wisniewski et al. | 220/359.1 |
| 2004/0151932 A1 * | 8/2004 | Galloway | 428/515 |
| 2004/0251164 A1 * | 12/2004 | Yasuike et al. | 206/524.4 |
| 2006/0172131 A1 * | 8/2006 | Haedt et al. | 428/336 |
| 2007/0104398 A1 * | 5/2007 | Ours | 383/211 |
| 2007/0142558 A1 * | 6/2007 | Mavridis | 525/240 |

FOREIGN PATENT DOCUMENTS

| | | | |
|---|---|---|---|
| JP | 06-032359 A | | 2/1994 |
| JP | 7 032555 | | 2/1995 |
| JP | 07032555 A | * | 2/1995 |
| JP | 07-112746 | | 5/1995 |
| JP | 09226781 A | * | 9/1997 |
| JP | 2938186 B2 | | 6/1999 |
| JP | 2000-202958 A | | 7/2000 |
| JP | 2000202958 A | * | 7/2000 |
| JP | 2003137314 A | * | 5/2003 |
| JP | 2004-122374 A | | 4/2004 |
| JP | 2004122374 A | * | 4/2004 |
| JP | 2004-268321 A | | 9/2004 |
| JP | 2004268321 A | * | 9/2004 |
| JP | 2005-296728 A | | 10/2005 |
| WO | WO 02068283 A1 | * | 9/2002 |

OTHER PUBLICATIONS

Translation of JP 2004-268321 A, Sep. 2004.*
Li et al., Control of Adhesion and Removal of Heat Sealable Tops on Polymer Containers, Jan. 2002.*
Machine Translation of JP 09-226781 A, Sep. 1997.*
Machine Translation of JP 2003-137314 A, May 2003.*
Machine Translation of JP 2004-122374 A, Apr. 2004.*
Machine Translation of JP 07-032555 A, Feb. 1995.*
Nicastro et al, Effect of storage temperature on heat sealability of propylene film, Tappi Journal, vol. 76, No. 8, Aug. 1993.*
Stehling et al., Heat Sealing of Semicrystalline Polymer Films. II. Effect of Melting Distribution on Heat-Sealing Behavior of Polyolefins, Journal of Applied Polymer Science, vol. 51, pp. 105-119, 1994 (no month).*
Tetsuya et al., Effect of Heat-Sealing Temperature on Properties of OPP/CPP Heat Seals. Part II. Crystallinity and Thermomechanical Properties, Journal of Applied Polymer Science, vol. 99, pp. 513-519, 2006eff (no month).*
Machine Translation of FR 2783512 A1, Mar. 2000.*
Machine Translation of WO 02068283 A1, Sep. 2002.*
International Preliminary Report on Patentability for PCT/JP2007/062796 dated Jan. 29, 2009.
Idemitsu Petrochem Co Ltd., "Multi-layer structure and easily openable container," Patent Abstracts of Japan, Publication Date: Feb. 3, 1995; English Abstract of JP-7 032555.
Supplementary European Search Report for EP 07767602 dated Jun. 11, 2012.
Supplementary European Search Report for EP07767602 dated Jun. 15, 2012.
Supplementary European Search Report for EP07767602 dated Jun. 18, 2012.
Notice of Reasons for Rejection for JP-2008 522587 dated Jul. 24, 2012.
English Translation of Notice of Reasons for Rejection for JP-2008 522587 dated Jul. 24, 2012.
Idemitsu Petrochem Co Ltd., "Easily Openable sealed bag," Patent Abstracts of Japan, Publication Date: May 2, 1995; English Abstract of JP-07-112746.

* cited by examiner

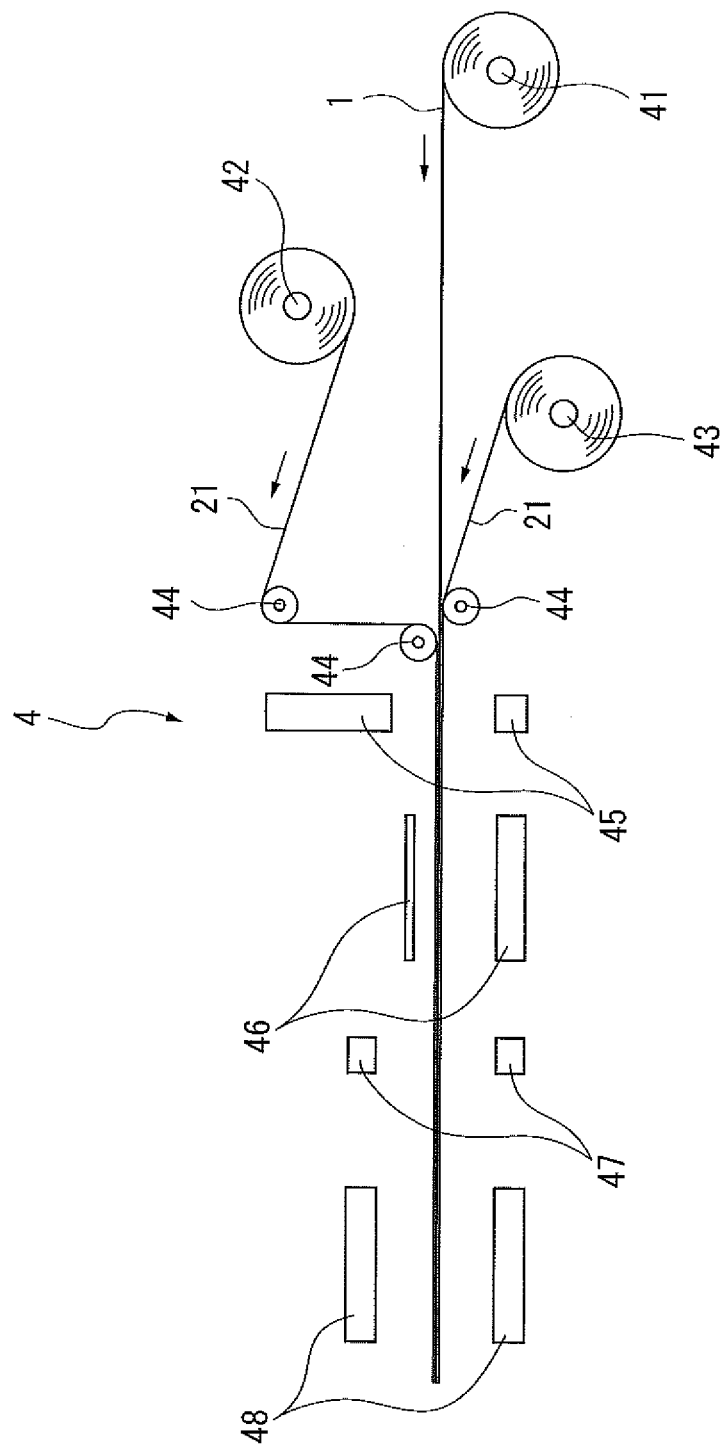

LAMINATED TAPE, PACKAGE, AND PROCESS FOR PRODUCING LAMINATED TAPE

TECHNICAL FIELD

The present invention relates to a laminated tape, packaging body and a method for manufacturing a laminated tape.

BACKGROUND ART

Foods and medicines are packaged within a thermoforming container and soft package bag to be stored. It is required for such packaging bodies to be capable of re-sealing in order to avoid drying, moisture-absorbing and degrading of the contents. However, once opened, a thermoforming container and a soft package bag are structurally difficult to be re-sealed. In some examples, a fastener tape is attached to a soft package bag to allow re-sealing. However, the use of a fastener tape requires too much cost and labor to be economical. Accordingly, a technique that allows re-sealing of such package body with ease and with low cost has been desired.

As a package body that is capable of re-sealing after being opened, traditionally known arrangement employs lamination of a heat-seal layer, an adhesive layer and a base layer. For instance, Patent Document 1 teaches a soft wrapping material including a surface layer, adhesive layer and base layer. In this arrangement, since the adhesive layer is provided on the entire surface of the bag, the adhesive applied on the surface other than the sealed portion is useless and is thus not economical. Accordingly, in order to apply the adhesive layer solely on the sealed portion, a tape-shaped interlaminar separation member in which an adhesive material layer of acrylic resin and the like is disposed on an intermediate layer has been proposed (Patent Document 2). The producing method of the tape is disclosed in Patent Document 3, where an adhesive resin layer containing rubber thermoplastic resin and tackifier is co-extruded with polyolefin in a film-shape, which is passed through a slit to produce a plurality of tapes.

| [Patent Document 1] | JP-B-2938186 |
| [Patent Document 2] | JP-A-06-32359 |
| [Patent Document 3] | JP-A-2004-122374 |

DISCLOSURE OF THE INVENTION

Problems to be Solved by the Invention

When a package body attached with the tape disclosed in Patent Document 2 or 3 is to be opened, the adhesive layer is peeled by splitting the surface layer of the tape to expose the adhesive layer. However, since the force is applied on both surfaces of the adhesive layer, the both sides of the adhesive layer are often peeled off. In this case, since smoothness of the peeling interface through which the adhesive layer is exposed is impaired, the adhesion strength when the tape is re-sealed is considerably reduced. In other words, since it is impossible to control which one of the surfaces of the adhesive layer is to be peeled, re-adhesion strength cannot be maintained.

An object of the present invention is to provide a laminated tape that can control the surface to be peeled when being opened and exhibits excellent re-adhesion strength when being re-adhered after being opened, a packaging body and a manufacturing method of the laminated tape.

Means for Solving the Problems

A laminated tape according to an aspect of the invention is used for sealing a packaging body, which includes: an adhesive material layer; a first polyolefin layer laminated on a first side of the adhesive material layer; and a second polyolefin layer laminated on a second side of the adhesive material layer, the first and the second polyolefin layers being welded onto mutually opposing attachment portions of the packaging body, where the adhesive material layer is in contact with the first polyolefin layer and the second polyolefin layer at contact surfaces, one of the contact surfaces defining an easy-peel layer being capable of peeled off more easily than the other of the contact surfaces.

According to the above aspect of the invention, since the one of the surfaces of the adhesive material layer is the easy-peel surface that can be peeled off more easily than the other of the surfaces of the adhesive material layer, the packaging body can be securely peeled off at the easy-peel surface when the packaging body is opened. Accordingly, flat peeling surface and, consequently, larger re-adhesion strength of the laminated tape can be obtained, thus achieving re-sealing of the packaging body.

In the above arrangement, the first and the second polyolefin layers are preferably bonded at packaging-contents-side ends thereof or at ends on both sides, and the adhesive material layer is preferably sandwiched between the first and the second polyolefin layers except for the bonded ends.

According to the above arrangement, since the contents-side of the adhesive material layer is covered with the first and the second polyolefin layers, the adhesive material is not exposed to the contents-side when the packaging body is sealed. Accordingly, since the migration of oil-soluble component decreases when being subjected to heat-sterilization, no sanitary problem occurs and the contents inside the packaging body can be heat-sterilized by boiling etc.

In the above arrangement, it is preferable that an adhesive material of the adhesive material layer contains a rubber copolymer containing styrene block and diene block, tackifier resin and plasticizer.

According to the above arrangement, since the adhesion material of which main components are the rubber copolymer containing styrene block and diene block, tackifier resin and plasticizer is used, less smell is generated and high re-adhesion strength can be obtained.

In the above arrangement, it is preferable that the first polyolefin layer and the second polyolefin layer are made of the same kind of polyolefin, and a thickness of the first polyolefin layer and the adhesive material layer is 30 mm or more and a thickness of the second polyolefin layer is less than 30 mm.

According to the above arrangement, since the thickness of the first polyolefin layer is 30 μm or more and the thickness of the second polyolefin layer is less than 30 μm, the second polyolefin layer is securely split and is peeled off at the interference between the second polyolefin layer and the adhesive material layer when the tape is opened.

When the thickness of the first polyolefin layer is less than 30 μm, the first polyolefin layer is also likely to be split, resulting in uneven peeling surface. Further, when the thickness of the adhesive material layer is less than 30 μm, the first polyolefin layer and the adhesive material layer are also likely to be split at the interface therebetween, thus failing to obtain even peeling surface. Further, when the thickness of the second polyolefin layer is 30 μm or more, great opening strength is required and the packaging body may not be opened.

Accordingly, the tape can be securely peeled off at the interference between the second polyolefin layer and the adhesive material layer, thus controlling the peeling surface.

In the above arrangement, it is preferable that the first polyolefin layer is made of polyolefin having higher crystallinity than the polyolefin of the second polyolefin layer, and a thickness of the first polyolefin layer is 30 mm or more and a thickness of the adhesive material layer and the second polyolefin layer is less than 30 mm.

According to the above arrangement, since the thickness of the first polyolefin layer is 30 μm or more and the thickness of the second polyolefin layer is less than 30 μm, the second polyolefin layer is securely split when the packaging body is opened. Since the second polyolefin layer is made of polyolefin having lower crystallinity than that of the polyolefin constituting the first polyolefin layer, the adhesive material layer is also split after splitting the second polyolefin layer at the interface between the adhesive material layer and the first polyolefin layer. When both of the first and the second polyolefin layers are made of the same kind of polyolefin, the tape is likely to be peeled off at the interface between the adhesive material layer and the second polyolefin layer, thus failing to exhibit even peeling surface.

When the thickness of the first polyolefin layer is less than 30 μm, the first polyolefin layer as well as the second polyolefin layer is also likely to be split, resulting in uneven peeling surface. Further, when the thickness of the second polyolefin layer is 30 μm or more, great opening strength is required and the packaging body may not be opened.

Accordingly, by selecting appropriate thickness and material for the respective layers, the peeling surface can be easily controlled.

In the above arrangement, it is preferable that the first polyolefin layer is made of homo-polypropylene or block-polypropylene and the second polyolefin layer is made of a random polypropylene or a blend resin of polypropylene and polyethylene. According to the above arrangement, since the first polyolefin layer is made of homo-polypropylene or block-polypropylene and the second polyolefin layer is made of random polypropylene or blend resin of polypropylene and polyethylene, the above advantage can be obtained.

In the above arrangement, the first polyolefin layer is preferably made of high-density polyethylene and the second polyolefin layer is preferably made of low-density polyethylene or linear polyethylene.

According to the above arrangement, since the first polyolefin layer is made of high-density polyethylene and the second polyolefin layer is made of low-density polyethylene or linear polyethylene, the above advantage can be obtained.

In the above arrangement, it is preferable that the first polyolefin layer is made of polyolefin having lower crystallinity than the polyolefin of the second polyolefin layer, and a thickness of the first polyolefin layer and the adhesive material layer is 30 mm or more and a thickness of the second polyolefin layer is less than 30 mm.

According to the above arrangement, since the thickness of the first polyolefin layer is 30 μm or more and the thickness of the second polyolefin layer is less than 30 μm, the second polyolefin layer is split when the packaging body is opened. Since the second polyolefin layer is made of polyolefin having lower crystallinity than that of the polyolefin constituting the first polyolefin layer, the tape is split off at the interface between the second polyolefin layer and the adhesive material layer.

When the thickness of the first polyolefin layer is less than 30 μm, the first polyolefin layer as well as the second polyolefin layer is also likely to be split, resulting in uneven peeling surface. On the other hand, when the thickness of the adhesive material layer is less than 30 μm, the adhesive material layer is likely to be split subsequently to the splitting of the second polyolefin layer, resulting in uneven peeling surface. Further, when the thickness of the second polyolefin layer is 30 μm or more, great opening strength is required and the packaging body may not be opened.

Accordingly, by selecting appropriate thickness and material for the respective layers, the peeling surface can be easily controlled.

In the above arrangement, it is preferable that the first polyolefin layer is made of a random polypropylene or a blend resin of polypropylene and polyethylene, and the second polyolefin layer is made of homo-polypropylene or block polypropylene.

According to the above arrangement, since the first polyolefin layer is made of random polypropylene or blend resin of polypropylene and polyethylene and the second polyolefin layer is made of homo-polypropylene or block-polypropylene having higher crystallinity than the random polypropylene or blend resin of polypropylene and polyethylene, the above advantage can be obtained.

In the above arrangement, it is preferable that the first polyolefin layer is made of a low-density polyethylene or linear polyethylene and the second polyolefin layer is made of a high-density polyethylene.

According to the above arrangement, since the first polyolefin layer is made of low-density polyethylene or linear polyethylene and the second polyolefin layer is made of high-density polyethylene having higher crystallinity than the low-density polyethylene or linear polyethylene, the above advantage can be obtained.

A packaging body according to another aspect of the invention includes: the above-described laminated tape, the laminated tape being welded onto mutually opposing to-be-attached portion.

According to the above aspect of the invention, since the above-described laminated tape is attached to the packaging body, the packaging body can achieve the above advantages.

A manufacturing method of the laminated tape according to still another aspect of the invention includes: a multilayer profiled co-extruding, in which polyolefin and adhesive material are co-extruded using a profiled die to form the first polyolefin layer, the adhesive material layer and the second polyolefin layer.

According to the above aspect of the invention, a three-layered laminated tape of two or three types of resins can be manufactured in one step by loading polyolefin and the adhesive material layer into a profiled die.

BRIEF DESCRIPTION OF DRAWINGS

FIG. 10 is a schematic illustration showing a manufacturing method of the packaging body according to the first embodiment.

BEST MODE FOR CARRYING OUT THE INVENTION

Figure 1:
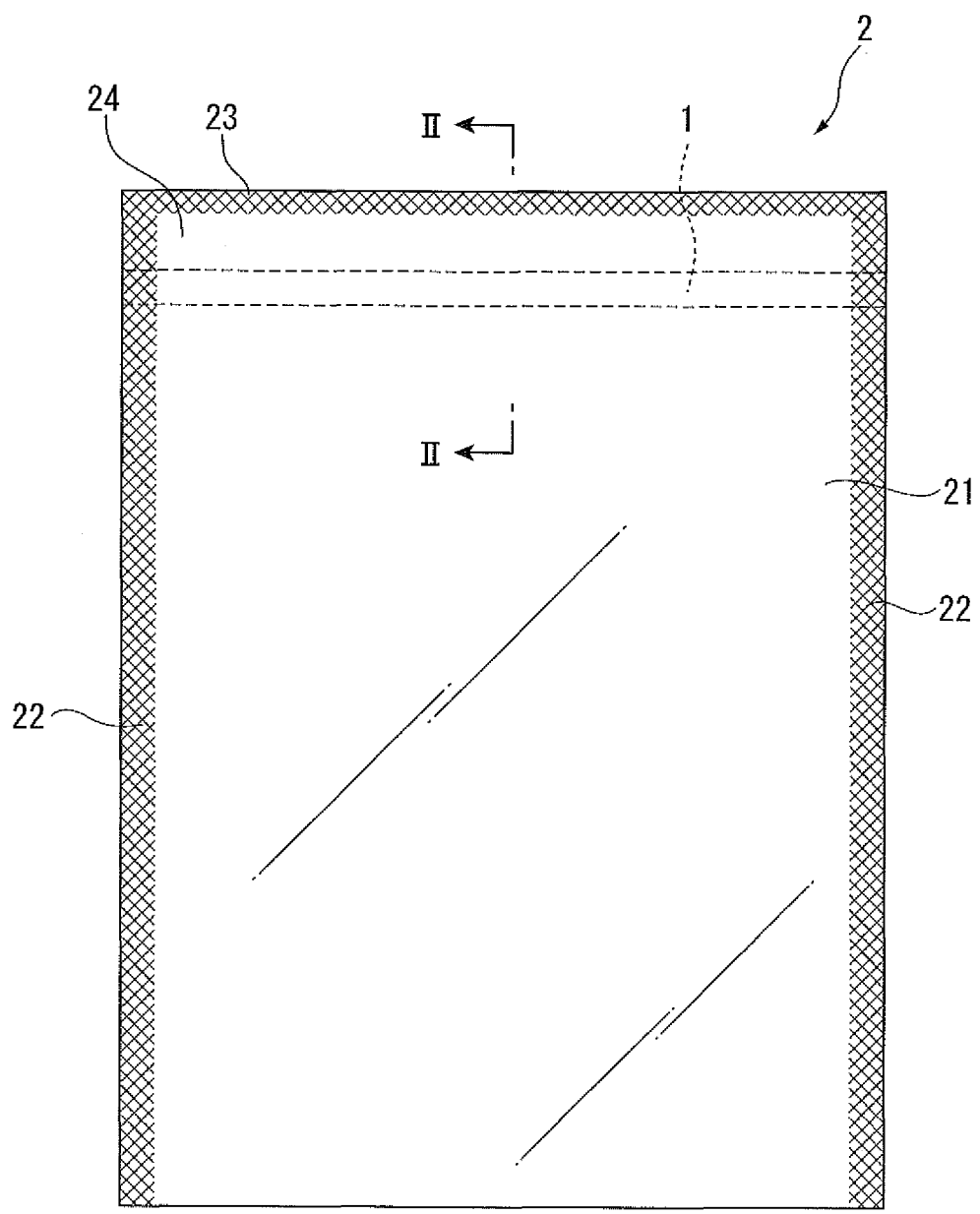
FIG. 1 is a front elevation of a packaging body according to a first embodiment of the invention.

An embodiment of the present invention will be described below with reference to the attached drawings. In the following description of the embodiment(s), components applied with the same reference numerals will not or briefly be explained.

Initially, a first embodiment of the invention will be described below with reference to FIGS. 1 to 3.

First Embodiment

FIG. 1 is a front elevation of a sealed packaging body attached with a laminated tape of the present embodiment. FIG. 2 is a cross section taken along II-II line in FIG. 1 according to the first embodiment. FIG. 3 is a cross section showing an open state of the packaging body shown in FIG. 2.

As shown in FIG. 1, a laminated tape 1 is attached to the packaging body 2. The packaging body 2 is formed by superposing base films (wrapping material) 21 and providing side seal portions 22 and a top seal portion 23 on the periphery thereof. The laminated tape 1 is attached to an inner surface of an opening 24 of the packaging body 2.

Incidentally, after contents (not shown) are packed through a bottom of the packaging body 2, the bottom side of the packaging body 2 is sealed to provide hermetic space.

In use, a user cuts the opening 24 to open the package and reseal the package with the laminated tape 1.

Figure 2:
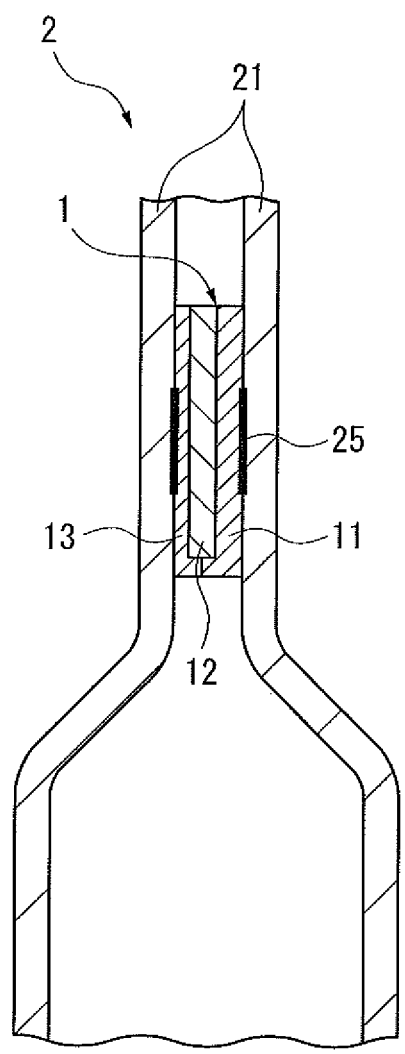
FIG. 2 is a cross section taken along II-II line in FIG. 1 according to the first embodiment.

As shown in cross section of FIG. 2, the laminated tape 1 has a three-layered structure including: an adhesive material layer 12 provided in the middle; a first polyolefin layer 11 provided on one side of the adhesive material layer 12; and a second polyolefin layer 13 provided on the other side of the adhesive material layer 12. The laminated tape 1 is welded at attachment portions 25 to be sandwiched by the opposing base films 21 of the packaging body 2. The length of the respective layers of the laminated tape 1 is arranged so that the contents-side ends of the first polyolefin layer 11 and the second polyolefin layer 13 extend longer relative to the end of the adhesive material layer 12 and are bonded with each other to cover the contents-side end of the adhesive material layer 12. The attachment portions 25 are shorter than the length of the respective layers of the laminated tape 1, which is welded approximately at the center of the laminated tape 1.

Figure 3:
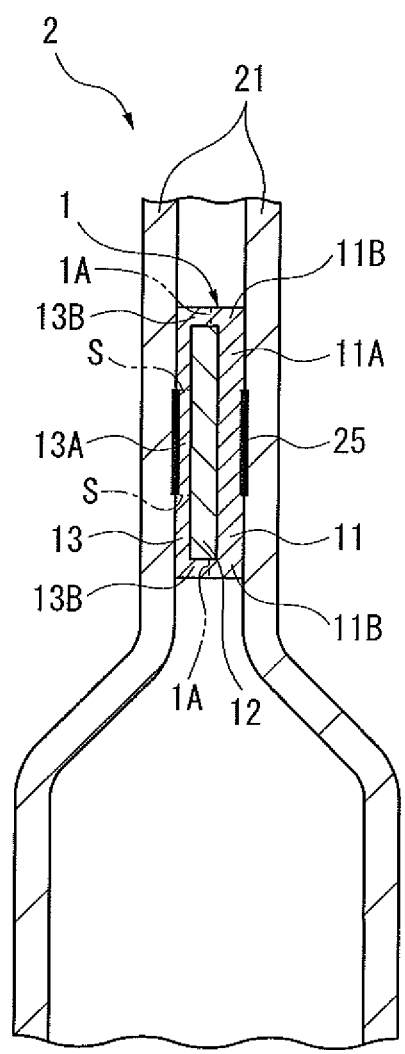
FIG. 3 is a cross section taken along II-II line in FIG. 1 according to a modification of the first embodiment.

Incidentally, the laminated tape 1 is not limited to the above arrangement, but may be arranged as shown in FIG. 3. In FIG. 3, the first polyolefin layer 11 and the second polyolefin layer 13 are respectively provided with flat portions 11A and 13A and elevational portions 11B and 13B formed by raising an end of the flat portions 11A and 13A, where ends of the elevational portions 11B and 13B are respectively bonded at the bonding portions 1A and the adhesive material layer 12 is accommodated therewithin. In this case, the adhesive material layer 12 is not exposed to the outside.

In the first embodiment, the same kind of polyolefin is used for the first polyolefin layer 11 and the second polyolefin layer 13. For instance, one or combination of two or more of homo-polypropylene (HPP), random-polypropylene (RPP), block-polypropylene (BPP), low-density polyethylene (LDPE), linear low-density polyethylene (L-LDPE) and high-density polyethylene (HDPE) may be used.

Further, for the purpose of modification, elastomer such as ethylene propylene rubber (EPR), styrene-ethylene-butylene-styrene block copolymer (SEBS) and styrene-ethylene-propylene-styrene block copolymer (SEPS) and inorganic filler such as talc may be added.

The adhesive material layer 12 is preferably provided by an adhesive material composed of two components of: rubber block copolymer containing styrene block and diene block; and tackifier resin.

The rubber block copolymer containing styrene block and diene block includes hydrogenated rubber block copolymer containing styrene block and diene block. Examples of the copolymer are: block copolymer in which polystyrene block and vinyl-polyisoprene block are bonded; block copolymer in which polystyrene block and ethylene-propylene block are bonded; block copolymer in which polystyrene block and ethylene-butadiene block are bonded; and block copolymer in which polystyrene block and ethylene-ethylene-propylene block are bonded.

Examples of the tackifier resin are: hydrogenated rosin resin, terpene resin, hydrogenated terpene resin, C5/C6 aliphatic petroleum resin, alicyclic petroleum resin and the like.

Adhesive material of three components, i.e. adding plasticizer to the rubber block copolymer containing styrene block and diene block and tackifier resin, is also preferable in terms of improvement of re-adhesion strength.

Examples of the plasticizer are liquid paraffin, process oil (aromatic, naphthenic or paraffinic petroleum hydrocarbon) and synthetic wax.

The adhesive material may further contain the mixture of the following particles (A) and (B).

(A) Particles mainly composed of: rubber block copolymer ($1a$) containing styrene block and diene block; and tackifier resin.

(B) Particles mainly composed of: rubber block copolymer ($1b$) containing styrene block and diene block; and plasticizer.

Mixing the following particle (C) in addition to the above particles (A) and (B) allows adjustment of blend ratio of rubber block copolymer, tackifier resin and plasticizer, thus modifying properties of the adhesive material in accordance with the requirement thereof.

(C) Particles mainly composed of rubber block copolymer ($1c$) containing styrene block and diene block.

The rubber block copolymer ($1c$) may be the same as the copolymer of the rubber block copolymers ($1a$), ($1b$). Alternatively, the rubber block copolymer ($1c$) may be the same as or different from the copolymer of the rubber block copolymers ($1a$), ($1b$). Though the rubber block copolymer ($1c$) may be the same as or different from the rubber block copolymers ($1a$), ($1b$), it is preferably different in terms of easiness of adjustment of properties.

Incidentally, the rubber block copolymers ($1a$), ($1b$), ($1c$) may be added with antioxidant and lubricant before being pelletized as long as the properties is not impaired.

The difference of the rubber block copolymers can be determined in accordance with hardness defined in JIS K-6253. The hardness according to JIS K6253 of the rubber block copolymer ($1a$) is preferably 36 or more. The hardness according to JIS K6253 of the rubber block copolymer ($1c$) is preferably 36 or less. By mixing different rubber block copolymers, re-seal strength can be improved in addition to attaining the above-described advantages.

The adhesive material layer 12 can be produced by kneading and melting the above rubber block copolymer, tackifier, plasticizer and the like. Preferably, the plasticizer is injected halfway through the production by a uniaxial extruder.

When the plasticizer is injected halfway through the production by the uniaxial extruder, an inexpensive extruder can be used and bonding strength can be easily adjusted only by changing the injection amount of the plasticizer.

The adhesion resin layer may contain antioxidant, inorganic filler such as talc and calcium carbonate, foaming agent, coloring agent such as titanium oxide and the like as long as the properties of the adhesive resin layer are not impaired.

The thickness of the respective layers of the laminated tape 1 composed of the above materials is preferably set so that the thickness of the first polyolefin layer 11 and the adhesive material layer 12 is greater than that of the second polyolefin layer 13. Especially, the thickness of the first polyolefin layer 11 and the adhesive material layer 12 is preferably 30 μm or more and the thickness of the second polyolefin layer 13 is preferably less than 30 μm.

When the thickness of the first polyolefin layer 11 is less than 30 μm, the first polyolefin layer 11 is also likely to be split, resulting in uneven peeling surface. On the other hand, when the adhesive material layer 12 is less than 30 μm, the adhesive material layer 12 may also be split concurrently with splitting of the second polyolefin layer 13, thus also resulting in uneven peeling surface. Further, when the thickness of the second polyolefin layer 13 is 30 μm or more, great opening strength is required and the packaging body may not be opened. Incidentally, in the embodiment shown in FIG. 3, the thickness of the flat portion 11A corresponds to the thickness of the first polyolefin layer 11 and the thickness of the flat portion 13A corresponds to the thickness of the second polyolefin layer 13.

Figure 4:
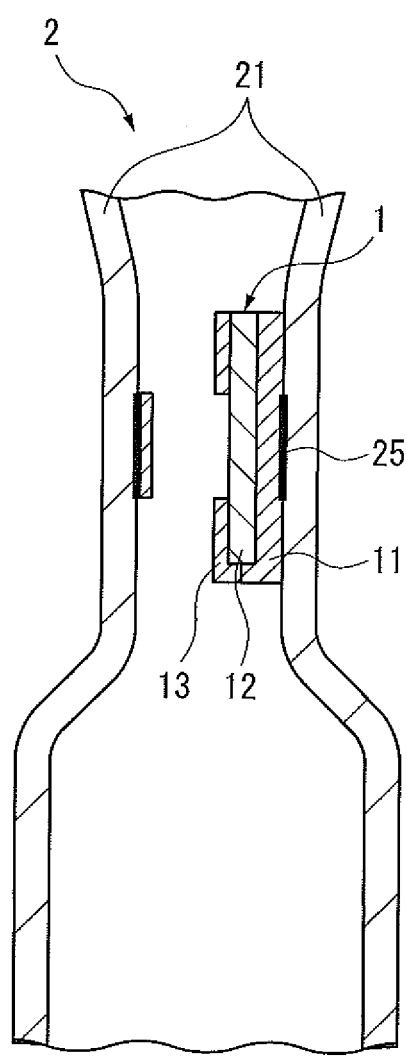
FIG. 4 is a cross section taken along II-II line in FIG. 1, which shows the packaging body shown in FIG. 2 is opened.

With such laminated tape 1, the second polyolefin layer 13 that is thinner than the first polyolefin layer 11 is peeled off from the neighborhood of the attachment portion 25 at the interface between the adhesive material layer 12 and the second polyolefin layer 13 as shown in FIG. 4. Incidentally, the second polyolefin layer 13 is split at the position S in the embodiment shown in FIG. 3.

The laminated tape 1 can be produced by feed-block-type or multi-manifold-type multi-layer profiled extruder. Additionally, the laminated tape 1 can also be produced by extruding the material with a multilayer circular die and flattening to form into a tape.

Figure 5:
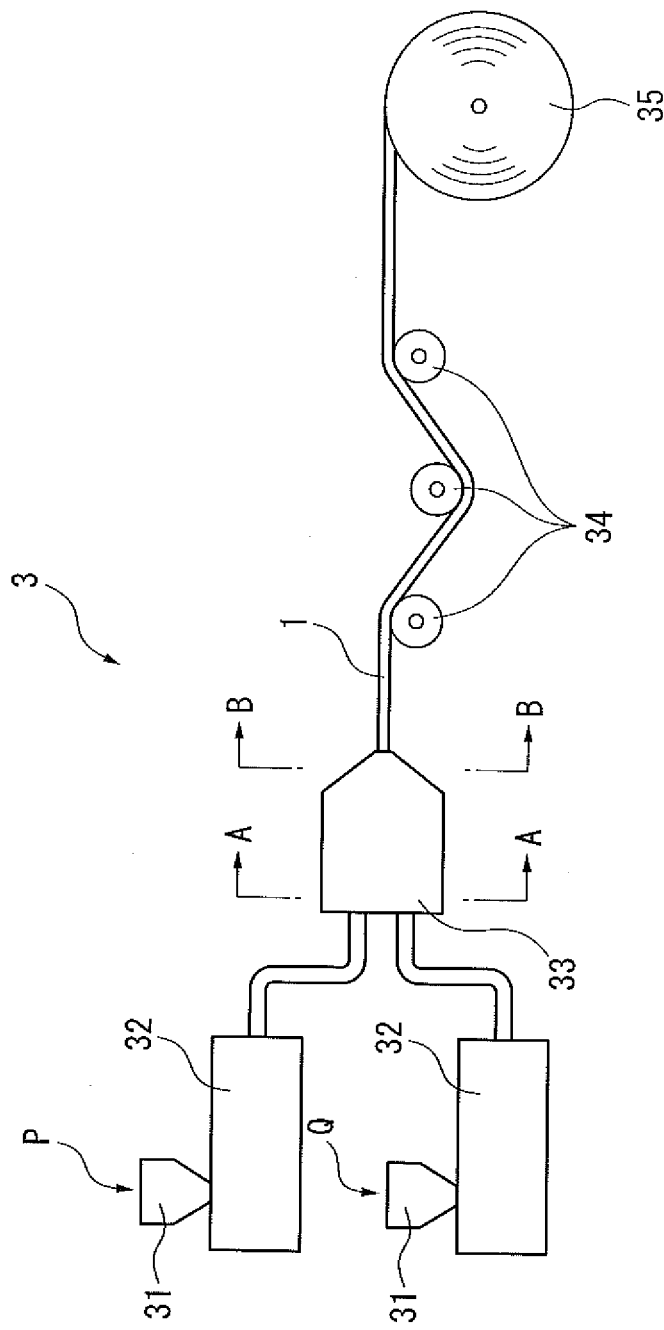
FIG. 5 is a schematic illustration of a manufacturing apparatus of a laminated tape according to the first embodiment.

A manufacturing method of the three-layered laminated tape 1 made of one type of polyolefin and one type of adhesive material will be explained with reference to FIG. 5.

A multilayer profiled co-extruder 3 includes: hoppers 31 into which polyolefin P and adhesive material Q are loaded; two extruders 32 for extruding the loaded polyolefin P and adhesive material Q; a profiled die 33 for molding the extruded polyolefin P and adhesive material Q into the shape of the laminated tape 1; a cooling roller 34 for cooling the molded laminated tape 1; and a winding roller 35 for winding the cooled laminated tape 1.

Figure 6A:
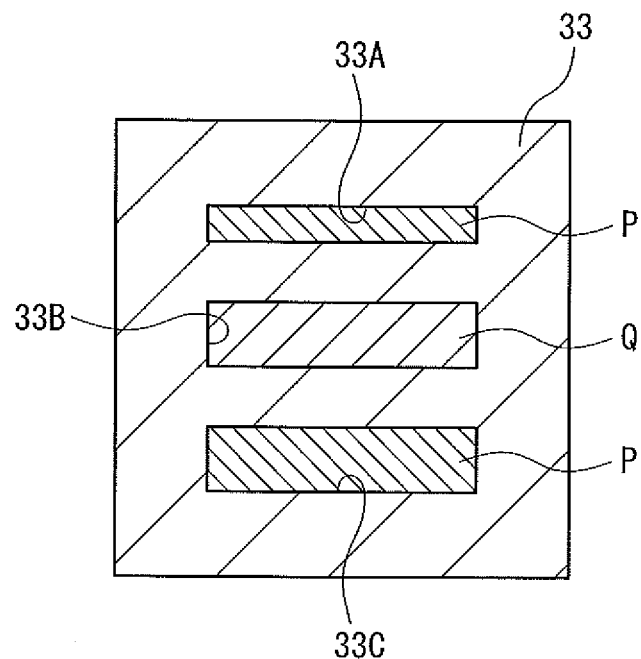
FIG. 6A is a cross section taken along A-A line in FIG. 5 according to the first embodiment.
Figure 6B:
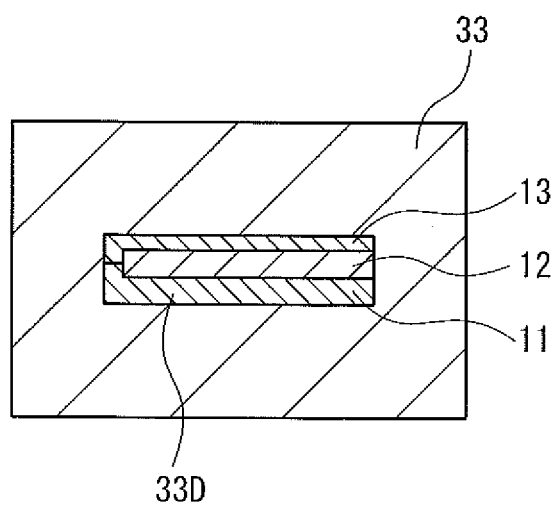
FIG. 6B is a cross section taken along B-B line in FIG. 5 according to the first embodiment.

Within the profiled die 33, the flow channel is deformed to mold the three-layered laminated tape 1 including the first polyolefin layer 11, the adhesive material layer 12 and the second polyolefin layer 13. A cross section taken along A-A line in FIG. 5 (entrance of the profiled die 33) is shown in FIG. 6A and another cross section taken along B-B line (exit of the profiled die) is shown in FIG. 6B. In FIG. 6A, the flow channels 33A, 33B, 33C are formed in a rectangle and approximately regular interval is provided between the respective flow channels. The adhesive material Q flows through the flow channel 33B disposed in the middle and the polyolefin P flows through the flow channels 33A and 33C provided on both sides of the adhesive material Q. Incidentally, the flow channel for the polyolefin P is branched while being extruded by the extruder 32 to be the upper flow channel 33A and the lower flow channel 33C in FIG. 6A at the entrance of the profiled die 33.

As shown in FIG. 6B, a single rectangular flow channel 33D is provided at the exit of the profiled die 33. The flow channels 33A, 33B, 33C branched into three at the entrance of the profiled die 33 are deformed within the profiled die 33 and are united into the flow channel 33D, so that the respective resins are integrated to form the three-layered laminated tape 1 having an end of the adhesive material layer 12 covered with polyolefin.

Incidentally, the thickness of the respective layers of the laminated tape 1 can be adjusted by changing the ratio of the screw revolving speed of the extruder 32 per each layer. The total thickness of the laminated tape 1 can be adjusted according to drawing speed of the laminated tape 1.

Figure 7A:
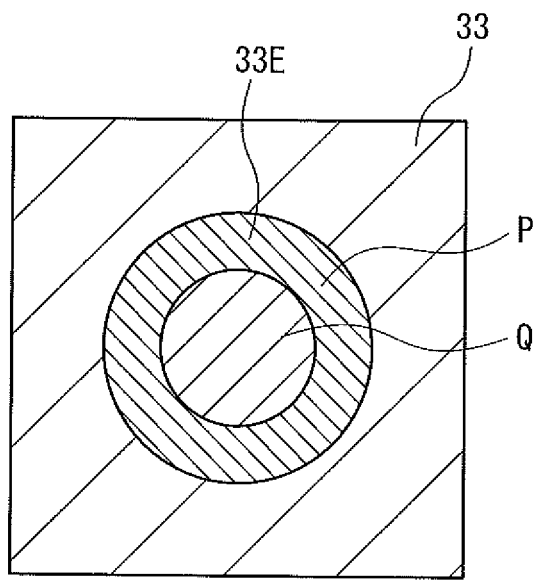
FIG. 7A is a cross section taken along A-A line in FIG. 5 according to a modification of the first embodiment.
Figure 7B:
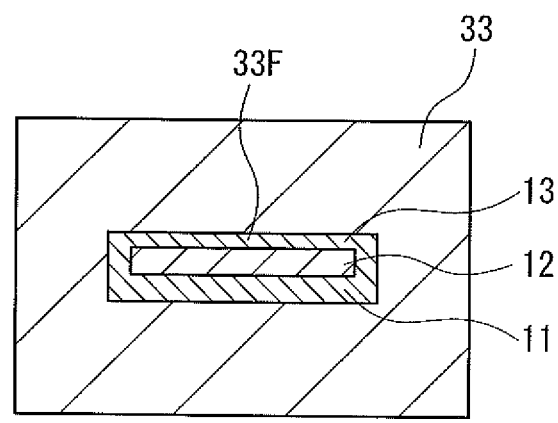
FIG. 7B is a cross section taken along B-B line in FIG. 5 according to the modification of the first embodiment.
Figure 8A:
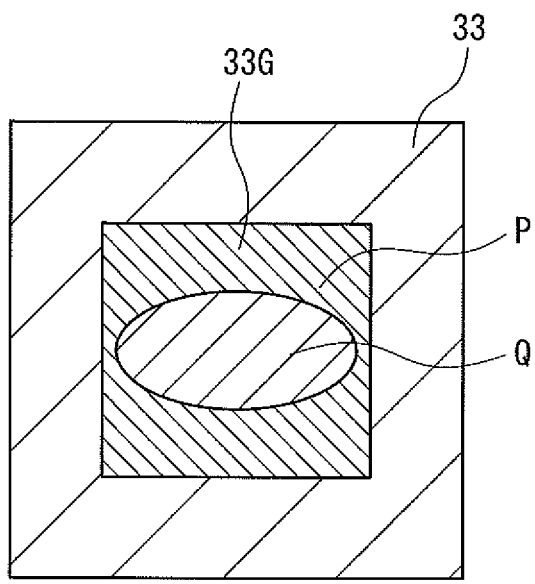
FIG. 8A is a cross section taken along A-A line in FIG. 5 according to another modification of the first embodiment.
Figure 8B:
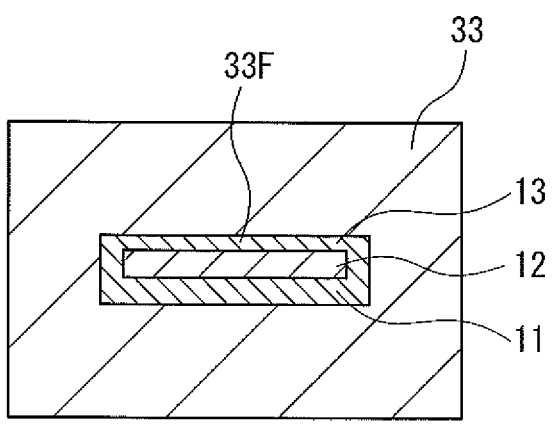
FIG. 8B is a cross section taken along B-B line in FIG. 5 according to the another modification of the first embodiment.
Figure 9A:
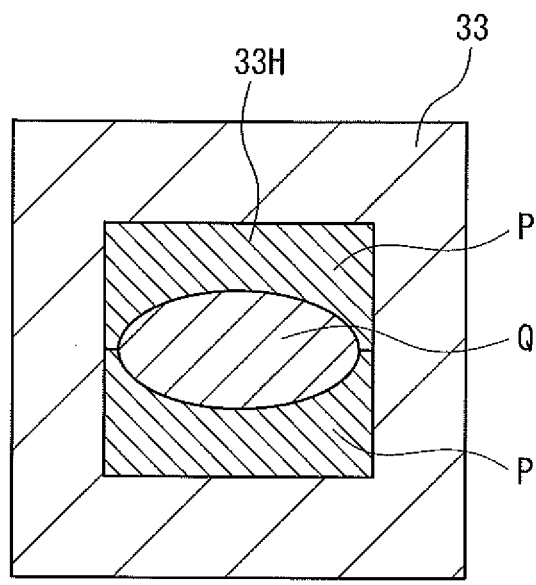
FIG. 9A is a cross section taken along A-A line in FIG. 5 according to still another modification of the first embodiment.
Figure 9B:
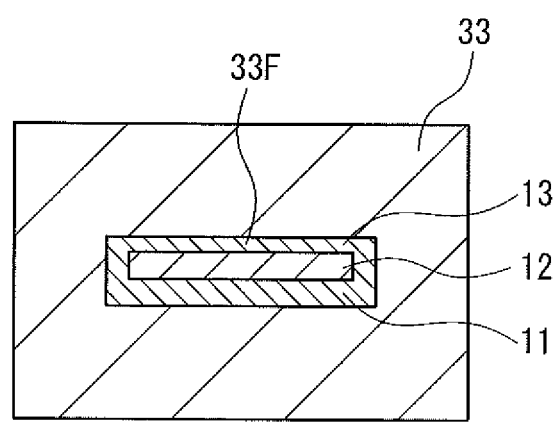
FIG. 9B is a cross section taken along B-B line in FIG. 5 according to the still another modification of the first embodiment.

Modifications of the profiled die 33 are shown in FIGS. 7A to 9B. In the same manner as FIG. 6A, FIGS. 7A, 8A and 9A show cross sections at the entrance of the profiled die 33. FIGS. 7B, 8B and 9B show cross sections at the exit of the profiled die 33.

In FIG. 7A, approximately circular flow channel 33E is formed. Within the flow channel 33E, the polyolefin P surrounds the periphery of the approximately circular adhesive material Q and exhibits approximately circular outer circumference along the shape of the flow channel 33E. In FIG. 8A, an approximately rectangular flow channel 33G is provided, within which the polyolefin P surrounds the periphery of the approximately circular adhesive material Q and exhibits approximately rectangular outer circumference along the shape of the flow channel 33G. In FIG. 9A, approximately rectangular flow channel 33H is provided, within which the polyolefin P surrounds the approximately circular adhesive material Q and exhibits approximately rectangular outer circumference along the shape of the flow channel 33H.

With such arrangements, by modifying the flow channel of the profiled die 33, the laminated tape 1 having the first polyolefin layer 11, the second polyolefin layer 13 and the adhesive material layer 12 accommodated within the polyolefin layers can be formed at the exit of the profiled die 33 as shown in FIGS. 7B, 8B and 9B.

Incidentally, the laminated tape 1 as formed by the die configurations shown in FIGS. 7A to 9B contains the adhesive material Q within a single type polyolefin P and the adhesive material layer 12 is not exposed to the outside.

Next, attachment process of the laminated tape 1 to the packaging body 2 will be described below with reference to FIG. 10 and FIGS. 11A to 11C.

In the first embodiment, the packaging body 2 is a four-side adhesion bag. The base film 21 of the packaging body 2 may be: a film made of polyethylene terephthalate (PET), nylon (Ny) and cast polypropylene (CPP); a film made of PET, aluminum (AL) foil and CPP; a film made of PET, Ny and L-LDPE; a transparent vapor-deposited film made of PET and L-LDPE; and a film made of Ny, ethylene vinyl alcohol (EVOH) and L-LDPE. In addition, polypropylene (PP) sheet, multilayer sheet made of polyethylene (PE) and polystyrene (PS), thermal molding product of a multilayer sheet made of Ny and PE may be used as the base film 21.

FIG. 10 is a schematic illustration of a manufacturing apparatus 4 for manufacturing the packaging body.

The manufacturing apparatus 4 includes: feed rollers 41, 42, 43; three rollers 44; an ultrasonic sealer 45; a tape sealer 46; and base film sealers 47 and 48.

The feed roller 41 feeds the laminated tape 1 that is wound thereon in advance. The feed rollers 42, 43 feed the base film 21 that is wound thereon in advance. The roller 44 supports the base film 21.

Simultaneously with continuously feeding the two base films 21 by the feed rollers 42 and 43 onto the manufacturing apparatus 4, the laminated tape 1 is also supplied onto the manufacturing apparatus 4 by the feed roller 41 so that the laminated tape 1 is sandwiched between the two base films 21. Then, using the ultrasonic sealer 45, the overlaid laminated tape 1 and the base films 21 are ultrasonic-sealed to provide ultrasonic seal portions 26 with an interval corresponding to the length of the opening 24 of the packaging body 2 (FIG. 11A).

Figure 11A:
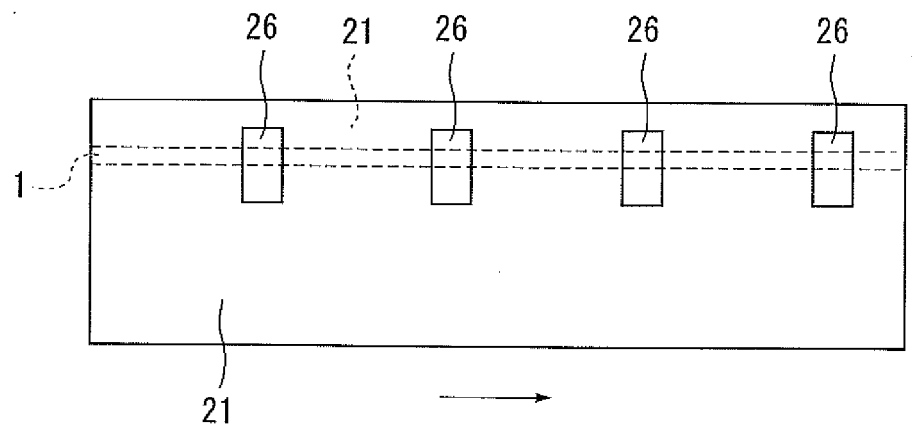
FIG. 11A is a schematic illustration showing a part of the manufacturing method of the packaging body according to the first embodiment.

Next, with the use of the tape sealer 46, the laminated tape 1 and the two base films 21 are sealed and bonded from both sides (FIG. 11A).

Figure 11B:
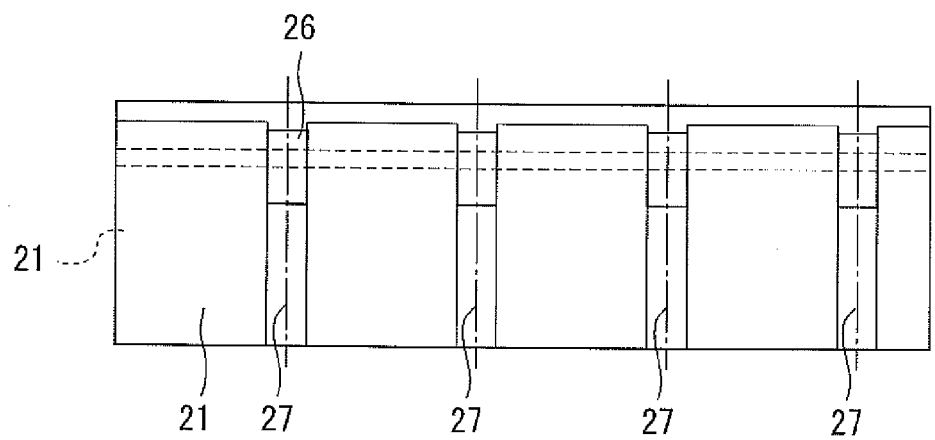
FIG. 11B is a schematic illustration showing another part of the manufacturing method of the packaging body according to the first embodiment.

Then, partitions 27 covering the ultrasonic seal portions 26 are provided in a direction orthogonal to the longitudinal direction of the base film 21, which are sealed by the base film sealer 47. Subsequently, with the use of the base film sealer 48, a side to be the opening 24 of the packaging body 2 is sealed (FIG. 11B).

Figure 11C:
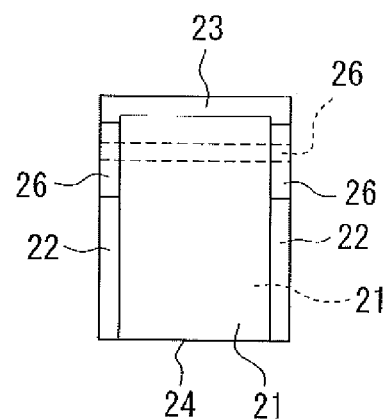
FIG. 11C is a schematic illustration showing still another part of the manufacturing method of the packaging body according to the first embodiment.

Finally, the base film 21 is cut along the centerline of the partitions 27 to obtain the packaging body 2 (FIG. 11C).

According to the first embodiment, following advantages can be obtained.

(1) Since the first polyolefin layer 11 and the second polyolefin layer 13 of the laminated tape 1 are made of the same kind of polyolefin and the thickness of the first polyolefin layer 11 and the adhesive material layer 12 is made greater than the thickness of the second polyolefin layer, the second polyolefin layer is split to peel off from the adhesive material layer at the interface between the adhesive material layer and the second polyolefin layer. Accordingly, only a predetermined side can be peeled, thus controlling the peeling surface. Since only the predetermined side is peeled off, flat peeling surface can be obtained so that excellent re-adhesion strength can be obtained even by re-sealing after opening the packaging body.

(2) Since the adhesion material layer is provided by a rubber copolymer containing styrene block and diene block, less smell is generated and high re-adhesion strength can be obtained.

(3) Since a multilayer co-extruder is used for manufacturing the laminated tape 1, the laminated tape 1 can be produced in a single step with less work and production cost.

(4) When the laminated tape 1 is configured so that the adhesive material layer 12 is accommodated within the first polyolefin layer 11 and the second polyolefin layer 13 as shown in FIG. 3, since the adhesive material layer 12 is not exposed to the outside after being sealed, less amount of oil-soluble component is eluted when the contents are heat-sterilized, so that sanitary condition can be kept.

Second Embodiment

Next, a second embodiment of the invention will be described below with reference to FIGS. 12 to 14. In the second embodiment, the arrangement of the laminated tape 1 made of two types of polyolefins and one type of adhesive material will be described. Since the second embodiment is the same as the first embodiment except for the arrangement of the laminated tape 1, description of the other features will not be mentioned.

Figure 12:
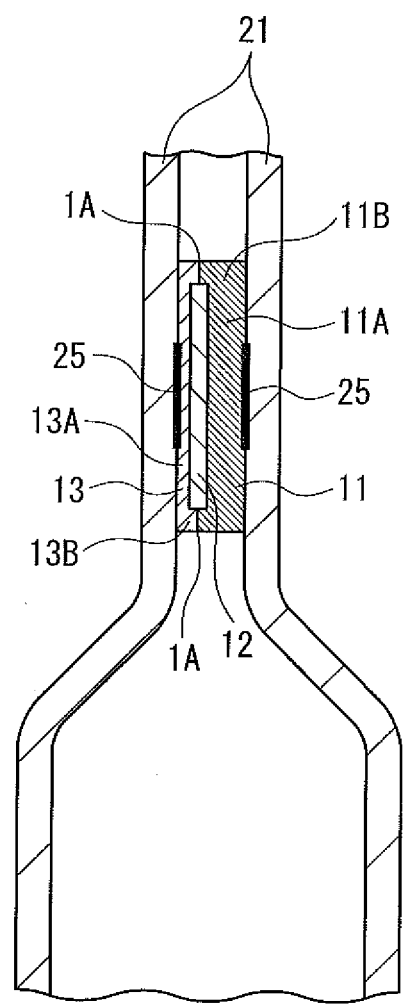
FIG. 12 is an illustration showing a second embodiment of the present invention, which corresponds to FIG. 2.

FIG. 12 is a cross section showing the packaging body 2 attached with the laminated tape 1 of the second embodiment. The first polyolefin layer 11 and the second polyolefin layer 13 are respectively provided with flat portions 11A and 13A and elevational portions 11B and 13B formed by raising an end of the flat portions 11A and 13A, where ends of the elevational portions 11B and 13B are respectively bonded at the bonding portions 1A and the adhesive material layer 12 is accommodated therewithin.

Figure 13:
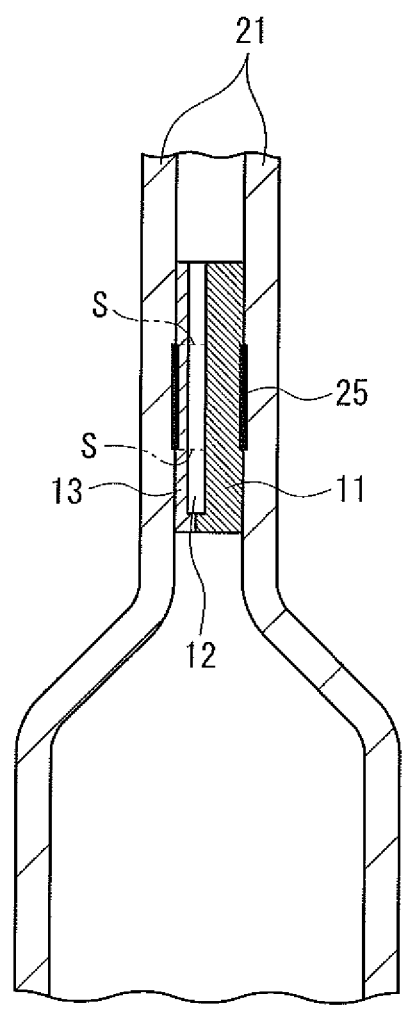
FIG. 13 is an illustration showing a modification of the second embodiment, which corresponds to FIG. 2.

As shown in FIG. 13, the laminated tape 1 may not be configured as the above but may be provided as a three-layered structure including: the adhesive material layer 12 provided in the middle; the first polyolefin layer 11 provided on one side of the adhesive material layer 12; and the second polyolefin layer 13 provided on the other side of the adhesive material layer 12, where contents-side end of the adhesive material layer 12 is covered with the first polyolefin layer 11 and the second polyolefin layer 13.

In the second embodiment, polyolefins with different crystallinity is used for the first polyolefin layer 11 and the second polyolefin layer 13.

For instance, the first polyolefin layer 11 is made of homopolypropylene or block polypropylene and the second polyolefin layer 13 is made of random polypropylene or blend resin of polypropylene and polyethylene. Alternatively, the first polyolefin layer 11 may be made of high-density polyethylene and the second polyolefin layer 13 may be made of low-density polyethylene or linear low-density polyethylene.

The adhesive material is the same as that is used in the first embodiment.

The thickness of the respective layers of the laminated tape 1 composed of the above material is preferably set so that the thickness of the first polyolefin layer 11 is greater than that of the adhesive material layer 12 and the second polyolefin layer 13. Especially, the thickness of the first polyolefin layer 11 is preferably 30 µm or more and the thickness of the adhesive material layer 12 and the second polyolefin layer 13 is preferably less than 30 µm.

When the thickness of the first polyolefin layer 11 is less than 30 µm, the first polyolefin layer 11 is also likely to be split, resulting in an uneven peeling surface. Further, when the thickness of the adhesive material layer 12 and the second polyolefin layer 13 is 30 µm or more, great opening strength is required and the packaging body may not be opened.

Figure 14:
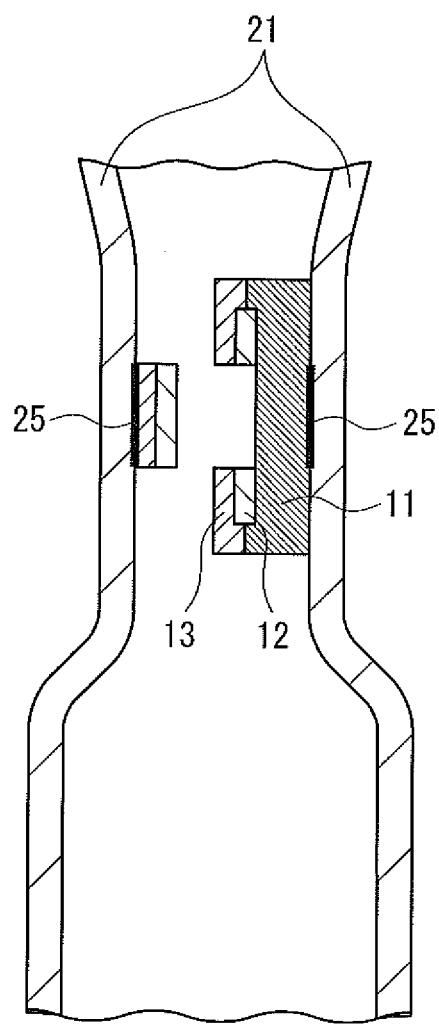
FIG. 14 is a cross section corresponding to FIG. 12 when being opened.

With such laminated tape 1, the second polyolefin layer 13 that is thinner than the first polyolefin layer 11 is securely peeled off from the neighborhood of the attachment portion 25 and, since the adhesive material layer 12 is as thin as 30 µm or less, the adhesive material layer 12 is also split after the second polyolefin layer 13 is split as shown in FIG. 14. Then, the interface between the first polyolefin layer 11 and the adhesive material layer 12 is peeled. Incidentally, the second polyolefin layer 13 and the adhesive material layer 12 are split at the position S in the embodiment shown in FIG. 13.

Figure 15:
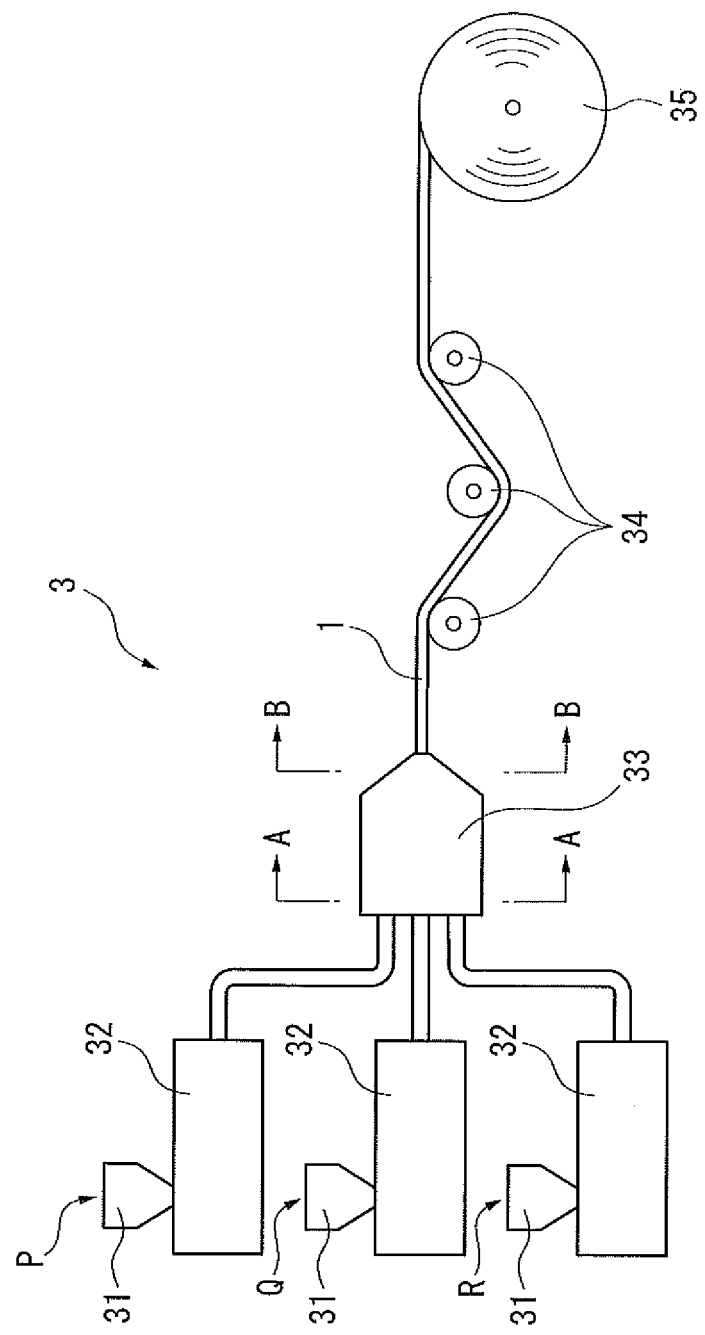
FIG. 15 is a schematic illustration of a manufacturing apparatus of a laminated tape according to the second embodiment.

The manufacturing method of the laminated tape 1 having three layers of three types of resins is shown in FIG. 15. Except for the number of the extruder 32 and the interior configuration of the profiled die 33, the arrangement is the same as that of the manufacturing method of three-layered tape of two types of resins.

The polyolefin P, adhesive material Q and polyolefin R loaded into the hoppers 31 are respectively extruded from three extruders 32 and are formed in the laminated tape 1 within the profiled die 33.

Figure 16A:
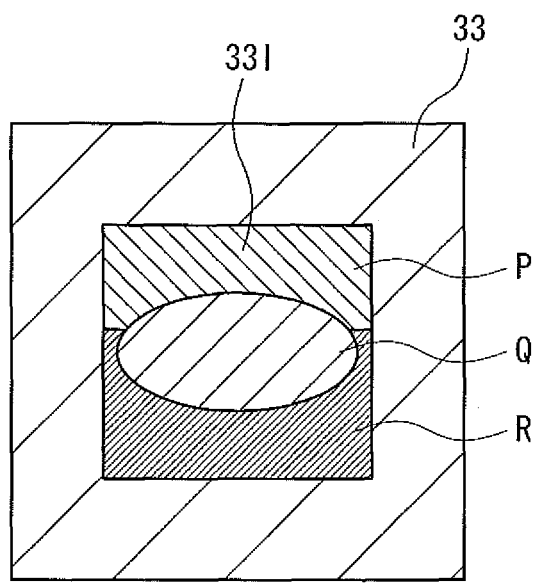
FIG. 16A is a cross section taken along A-A line in FIG. 15 according to the second embodiment.
Figure 16B:
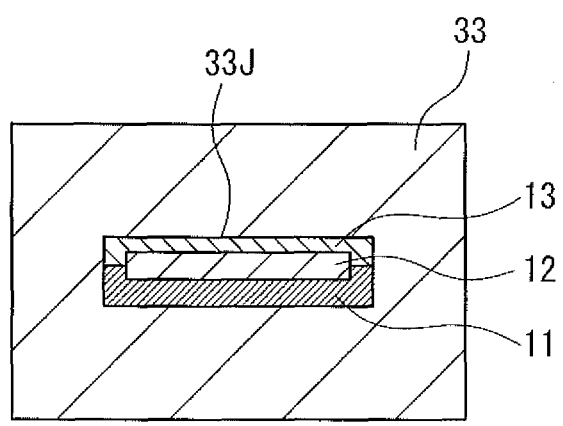
FIG. 16B is a cross section taken along B-B line in FIG. 15 according to the second embodiment.

FIGS. 16A and 16B show cross sections of the profiled die 33. FIG. 16A is a cross section at the entrance of the profiled die 33 and FIG. 16B is a cross section at the exit of the profiled die 33.

In FIG. 16A, a rectangular flow channel 33I is provided and resin layers are formed within the flow channel. The polyolefin P and polyolefin R surround the periphery of the approximately circular adhesive material Q. The outer periphery of the polyolefin P and polyolefin R extends in a rectangular shape along the flow channel 33I.

Such a configuration is provided by deforming the flow channels until the loaded polyolefin P, adhesive material Q and polyolefin R reach the entrance of the profiled die 33.

As shown in FIG. 16B, a rectangular flow channel 33J thinner than the flow channel 33I at the entrance is provided at the exit of the profiled die 33. The flow channel is deformed within the profiled die 33 to form the designed three-layered laminated tape 1 at the exit.

Figure 17A:
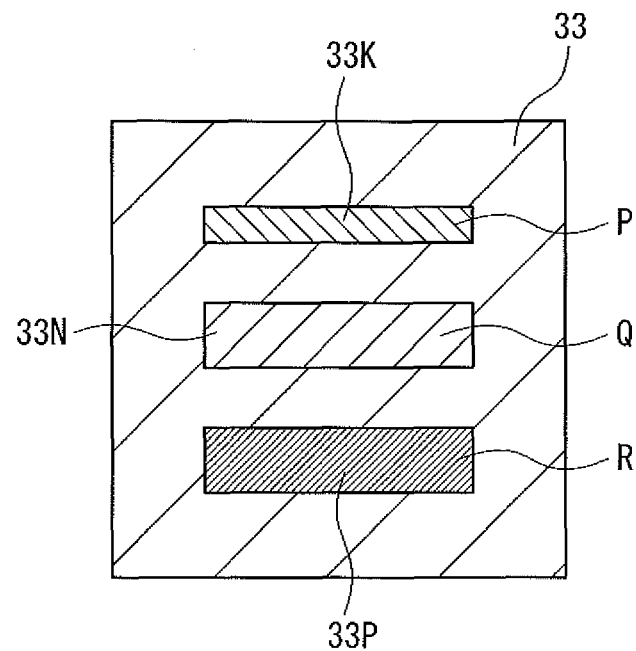
FIG. 17A is a cross section taken along A-A line in FIG. 15 according to a modification of the second embodiment.
Figure 17B:
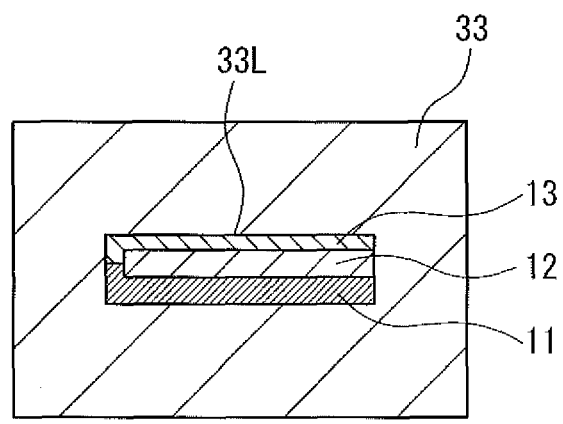
FIG. 17B is a cross section taken along B-B line in FIG. 15 according to the modification of the first embodiment.

Modifications of the profiled die 33 are shown in FIGS. 17A and 17B. In the same manner as FIGS. 16A and 16B, FIG. 17A shows a cross section at the entrance of the profiled die 33. FIG. 17B shows a cross section at the exit of the profiled die 33. Since FIGS. 17A and 17B show the same arrangement as those in the first embodiment except for the resin in the respective flow channels, detailed explanation will not be mentioned herein.

According to the second embodiment, the same advantages as the first embodiment can be obtained.

Third Embodiment

Next, a third embodiment of the invention will be described below with reference to FIG. 18. The laminated tape 1 according to the third embodiment is provided by two types of polyolefins and a single adhesive material. Since the second embodiment is the same as the first embodiment except for the arrangement of the laminated tape 1, description thereof will not be mentioned herein.

Figure 18:
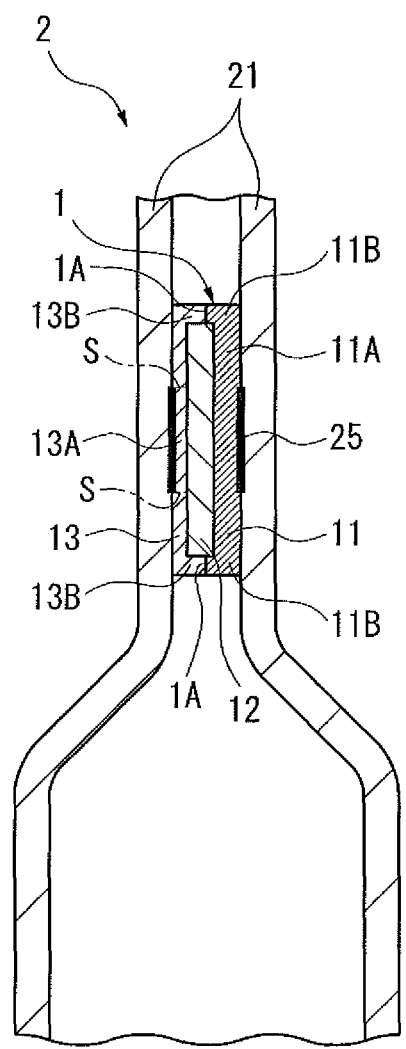
FIG. 18 is an illustration showing a third embodiment of the present invention, which corresponds to FIG. 2.

FIG. 18 is a cross section showing the packaging body 2 attached with the laminated tape 1 of the third embodiment. The first polyolefin layer 11 and the second polyolefin layer 13 are respectively provided with flat portions 11A and 13A and elevational portions 11B and 13B formed by raising an end of the flat portions 11A and 13A, where ends of the elevational portions 11B and 13B are respectively bonded at the bonding portions 1A and the adhesive material layer 12 is accommodated therewithin.

In the third embodiment, polyolefins with different crystallinity are used for the first polyolefin layer 11 and the second polyolefin layer 13.

For instance, the first polyolefin layer 11 is made of random polypropylene or blend resin of polypropylene and polyethylene and the second polyolefin layer 13 is made of homopolypropylene or block polypropylene. Alternatively, the first polyolefin layer 11 may be made of low-density polyethylene or linear low-density polyethylene and the second polyolefin layer 13 may be made of high-density polyethylene.

The adhesive material is the same as that is used in the first embodiment.

The thickness of the respective layers of the laminated tape 1 composed of the above material is preferably set so that the thickness of the first polyolefin layer 11 and the adhesive material layer 12 is 30 µm or more and the thickness of the second polyolefin layer 13 is less than 30 µm.

When the thickness of the first polyolefin layer 11 is less than 30 µm, the first polyolefin layer 11 is also likely to be split, resulting in uneven peeling surface. On the other hand, when the thickness of the adhesive material layer 12 is less than 30 µm, the adhesive material layer 12 is likely to be split subsequently to the splitting of the second polyolefin layer 13. Further, when the thickness of the second polyolefin layer 13 is 30 µm or more, great opening strength is required and the packaging body may not be opened.

With such laminated tape 1, the second polyolefin layer 13 that is thinner than the first polyolefin layer 11 is split at the position S in FIG. 18 to be peeled off at the interface between the second polyolefin layer 11 and the adhesive material layer 12.

Since such laminated tape 1 has three-layered structure of three types of materials, the same manufacturing method as the second embodiment can be applied.

According to the third embodiment, the same advantages as the first embodiment can be obtained.

Incidentally, the scope of the present invention is not limited to the above-described embodiments but also includes modifications and improvements as long as an object of the invention can be achieved.

For instance, though different materials are used for the first polyolefin layer 11 and the second polyolefin layer 13 in the second embodiment and the peeling surface is controlled by changing the thickness of the respective layers, the thickness of all of the respective layer may be made equal in controlling the peeling surface as long as the materials of the first polyolefin layer 11 and the second polyolefin layer 13 are different.

Figure 19:
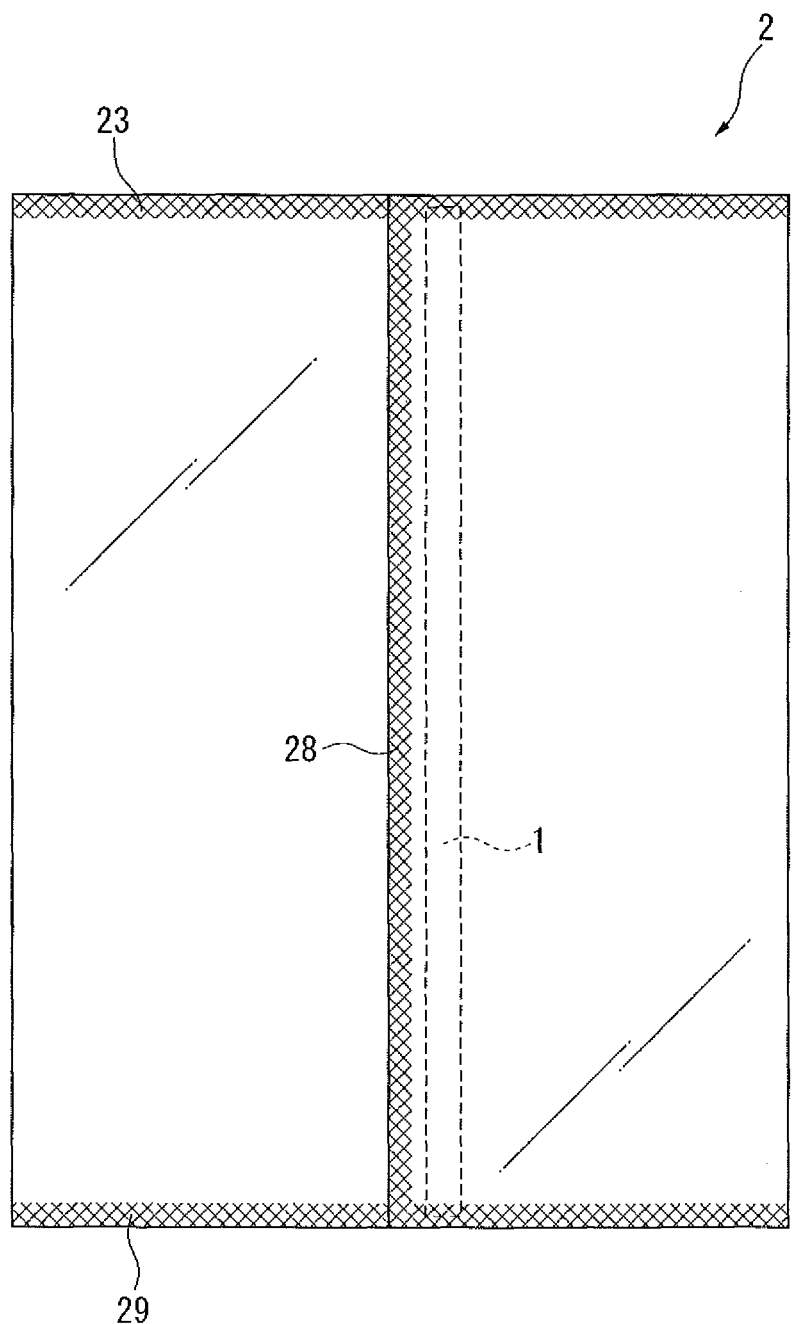
FIG. 19 is a front elevation of a packaging body according to a modification of the invention.
Figure 20:
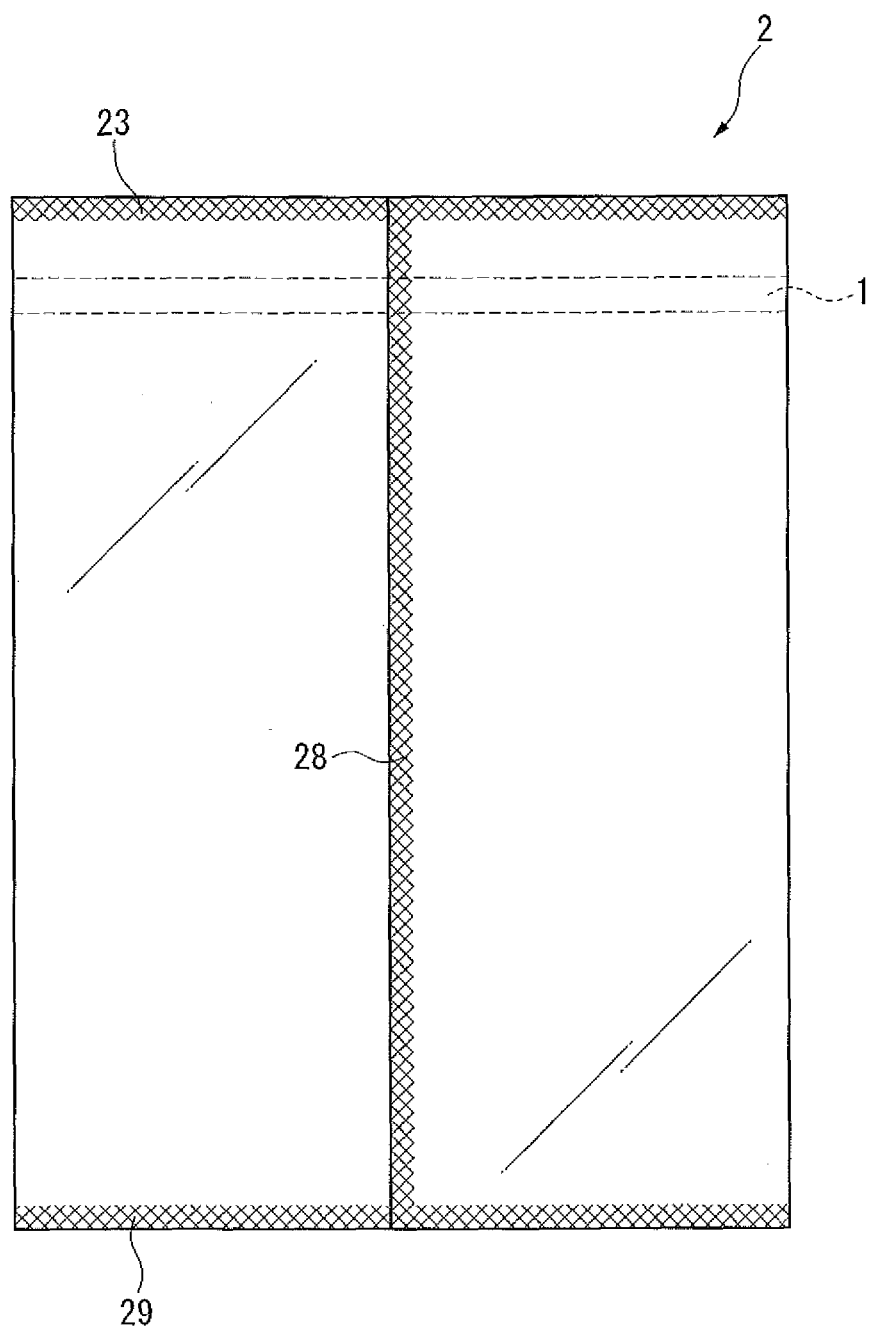
FIG. 20 is a front elevation of a packaging body according to another modification of the invention.

Though the packaging body on which the laminated tape 1 is welded is a four-side adhesion bag in the embodiments, the laminated tape 1 may be welded on a three-side adhesion pillow bag or between a container body and lid of a thermoforming container. More specifically, as shown in FIG. 19, the laminated tape 1 of the invention may be interposed in a vertically-provided fin-seal portion 28 of a three-side adhesion pillow bag. Alternatively, as shown in FIG. 20, the laminated tape 1 of the invention may be interposed on the horizontally-provided top seal portion 23. Further, the present invention can be applied to a four-side seal bag.

Further, though a multilayer profiled co-extruder using two extruders 32 is used in the first embodiment, the extruder 32 may be used for each layer. In other words, three extruders 32 may be used for manufacturing the three-layer laminated tape 1 out of two types of materials.

Further, when the laminated tape 1 is sealed from both sides to be welded in producing the packaging body 2, one of the sides may be widely sealed while the other side is relatively narrowly sealed. In this arrangement, the tape surface layer on the narrow side is susceptible to splitting, and thus is effective as an assist for obtaining an even peeling surface.

The seal width and seal configuration can be appropriately designed for obtaining appropriate opening strength and appropriate adhesion strength.

In order to improve sealability with the packaging body and horizontally curling of the tape, an additional resin layer may be provided on a side of the first polyolefin layer 11 or the second polyolefin layer 13 opposite to the adhesive material layer 12.

EXAMPLE

The invention will be described more specifically with reference to Examples and Comparisons. However, the scope of the invention is not limited to the Examples.

Test1

Initially, openability and re-adhesion property of the film attached with the laminated tape were evaluated. The tested laminated tape are listed below as Examples 1 to 9 and Comparisons 1 to 11.

Incidentally, the abbreviations of the resins mentioned in the respective Examples are as follows.

F329D: Prime Polypro F-329D (density 0.91, MFR=9 g/10 min, random PP) manufactured by Prime Polymer Co., Ltd.

F704NP: Prime Polypro F-704NP (density 0.9, MFR=7 g/10 min, homo PP) manufactured by Prime Polymer Co., Ltd.

J3051HP: Prime Polypro J-3051HP (density 0.9, MFR=40 g/10 min, block PP) manufactured by Prime Polymer Co., Ltd.

110Y: High-Density Polyethylene HI-ZEX 110Y (density 0.962, MFR=12 g/10 min) manufactured by Prime Polymer Co., Ltd.

C2494: Mirason C2494 (density 0.909, MFR=9.5 g/10 min, Low-Density PE) manufactured by Prime Polymer Co., Ltd.

1018CN: MORETEC 1018CN (density 0.91, MFR=8 g/10 min, Linear PE) manufactured by Prime Polymer Co., Ltd.

Y2045HP: Prime Polypro Y2045HP (density 0.91, MFR=20 g/10 min, random PP) manufactured by Prime Polymer Co., Ltd.

Y2000GV: Prime Polypro Y-2000GV (density 0.9, MFR=20 g/10 min, homo PP) manufactured by Prime Polymer Co., Ltd.

Example 1

First polyolefin layer: Random polypropylene (Prime Polypro F-744NP (density 0.9, MFR=6.4 g/10 min) manufactured by Prime Polymer Co., Ltd.), thickness 30 μm.

Adhesive material layer: Dry-blended resin of the following adhesive material 1 and the adhesive material 2 (mixture ratio 1:1), thickness 30 μm.

Second polyolefin layer: Random polypropylene (Prime Polypro F-744NP (density 0.9, MFR=6.4 g/10 min) manufactured by Prime Polymer Co., Ltd.), thickness 25 μm.

Adhesive material 1: Kneaded granulated body of rubber block copolymer containing styrene block and diene block; and tackifier resin.

100 parts of mixture of: 50 w % of polystyrene-polyisoprene block copolymer (Quintac 3520: MFR=7/200° C., 5 kg, density: 0.93, manufactured by ZEON Corporation); and 50 w % of CS-aromatic copolymer hydrogenated resin (I-MARY P-125 manufactured by Idemitsu Kosan Co., Ltd., softening point 125° C., density 1.03), was added with 1 part of antioxidant (IRGANOX 1010 manufactured by Ciba Specialty Chemicals K.K., which was subsequently melted and mixed at 180° C. by a biaxial extruder, was subjected to extrusion through water-cooled strand and was cut and granulated.

Adhesive material 2: Kneaded granulated body of rubber block copolymer containing styrene block and diene block. 60 w % of polystyrene-polyisoprene block copolymer (Quintac 3520: MFR=7/200° C., 5 kg, density: 0.93, manufactured by ZEON Corporation) added with 40 w % of process oil (Dyana Process Oil PW-90 manufactured by Idemitsu Kosan Co., Ltd.: density 0.8722) was churned and mixed, was subsequently melted and mixed at 180° C. by a biaxial extruder and was subjected to extrusion through water-cooled strand, which was cut and granulated. 0.5 part of talc powder was externally applied to 100 parts of granulated product in order to avoid blocking of the particles while being stocked.

Example 2

First polyolefin layer: F-704NP, thickness 30 μm
Adhesive material layer: adhesive material of Example 1, thickness 25 μm
Second polyolefin layer: F329D, thickness 25 μm
Laminate film: laminate film of Example 1

Example 3

First polyolefin layer: J3051HP, thickness 30 μm
Adhesive material layer: adhesive material of Example 1, thickness 25 μm
Second polyolefin layer: Y2045HP, thickness 25 μm
Laminate film: laminate film of Example 1

Example 4

First polyolefin layer: F704NP, thickness 30 μm
Adhesive material layer: adhesive material of Example 1, thickness 25 μm
Second polyolefin layer: 1:1 blend of F704NP and 110Y, thickness 25 μm
Laminate film: laminate film of Example 1

Example 5

First polyolefin layer: 110Y, thickness 30 μm
Adhesive material layer: adhesive material of Example 1, thickness 25 μm
Second polyolefin layer: C2494, thickness 25 μm
Laminate film: laminate film of Example 1

Example 6

First polyolefin layer: 110Y, thickness 30 μm
Adhesive material layer: adhesive material of Example 1, thickness 25 μm
Second polyolefin layer: 1018CN, thickness 25 μm
Laminate film: laminate film of Example 1

Example 7

First polyolefin layer: F329D, thickness 30 μm
Adhesive material layer: adhesive material of Example 1, thickness 30 μm
Second polyolefin layer: Y2000GV, thickness 25 μm
Laminate film: laminate film of Example 1

Example 8

First polyolefin layer: blend of F704NP and 110Y (F704NP:110Y=7:3), thickness 30 μm
Adhesive material layer: adhesive material of Example 1, thickness 30 μm
Second polyolefin layer: J3051HP, thickness 25 μm
Laminate film: laminate film of Example 1

Example 9

First polyolefin layer: blend of F704NP and 110Y (F704NP:110Y=7:3), thickness 30 μm
Adhesive material layer: adhesive material of Example 1, thickness 30 μm
Second polyolefin layer: Y2000GV, thickness 25 μm
Laminate film: laminate film of Example 1

Comparison 1

First polyolefin layer: F329D, thickness 30 μm
Adhesive material layer: adhesive material of Example 1, thickness 25 μm
Second polyolefin layer: F329D, thickness 25 μm
Laminate film: laminate film of Example 1

Comparison 2

First polyolefin layer: F329D, thickness 25 μm
Adhesive material layer: adhesive material of Example 1, thickness 30 μm
Second polyolefin layer: F329D, thickness 25 μm
Laminate film: laminate film of Example 1

[Comparison 3]
First polyolefin layer: F704NP, thickness 30 μm
Adhesive material layer: adhesive material of Example 1, thickness 25 μm
Second polyolefin layer: F329D, thickness 30 μm
Laminate film: laminate film of Example 1

Comparison 4

First polyolefin layer: F704NP, thickness 30 μm
Adhesive material layer: adhesive material of Example 1, thickness 30 μm
Second polyolefin layer: F329D, thickness 25 μm
Laminate film: laminate film of Example 1

Comparison 5

First polyolefin layer: J3051HP, thickness 30 μm
Adhesive material layer: adhesive material of Example 1, thickness 25 μm
Second polyolefin layer: Y2045HP, thickness 30 μm
Laminate film: laminate film of Example 1

Comparison 6

First polyolefin layer: F704NP, thickness 30 μm
Adhesive material layer: adhesive material of Example 1, thickness 30 μm
Second polyolefin layer: 1:1 blend of J704NP and 110Y, thickness 25 μm
Laminate film: laminate film of Example 1

Comparison 7

First polyolefin layer: 110Y, thickness 30 μm
Adhesive material layer: adhesive material of Example 1, thickness 25 μm
Second polyolefin layer: C2494, thickness 30 μm
Laminate film: PET (12 μm), Ny (15 μm) and LLDPE (50 μm)

Comparison 8

First polyolefin layer: 110Y, thickness 30 μm
Adhesive material layer: adhesive material of Example 1, thickness 30 μm
Second polyolefin layer: C2494, thickness 25 μm
Laminate film: PET (12 μm), Ny (15 μm) and LLDPE (50 μm)

Comparison 9

First polyolefin layer: 110Y, thickness 30 μm
Adhesive material layer: adhesive material of Example 1, thickness 25 μm
Second polyolefin layer: 1018CN, thickness 30 μm
Laminate film: PET (12 μm), Ny (15 μm) and LLDPE (50 μm)

Comparison 10

First polyolefin layer: 110Y, thickness 30 μm
Adhesive material layer: adhesive material of Example 1, thickness 30 μm
Second polyolefin layer: 1018CN, thickness 25 μm
Laminate film: PET (12 μm), Ny (15 μm) and LLDPE (50 μm)

Comparison 11

First polyolefin layer: F704NP, thickness 25 μm
Adhesive material layer: adhesive material of Example 1, thickness 25 μm
Second polyolefin layer: F329D, thickness 25 μm
Laminate film: laminate film of Example 1

[Arrangement of Multilayer Profiled Co-Extruder and Production of Laminated Tape]

A flow of adhesive material layer (cross sectional area of flow channel: 4 mm×30 mm) connected to a 30 mmφ uniaxial extruder that discharges the adhesive material was sandwiched by both of polyolefin discharged by a 40 mmϕ uniaxial extruder that discharges the polyolefin used for the first polyolefin layer and polyolefin discharged by 30ϕ uniaxial extruder that discharges the polyolefin used for the second polyolefin layer, which was united into a flow channel of 1 mm*30 mm cross sectional area. Then, the laminated tape was manufactured by a feed-block multilayer co-extruder, in which the integrated cross sectional shape remains 5 mm×40 mm before being connected to the entrance of the profiled die, which was 0.5 mm×50 mm at the exit of the profiled die.

Incidentally, the ratio of the respective layers was changed by screw revolution speed of the three extruders and the total thickness was adjusted in accordance with the drawing speed of the tape.

[Attachment of Laminated Tape]

A laminate film made of polyethylene terephthalate (PET 12 μm), Nylon (Ny, 15 μm) and cast polypropylene (CPP, 50 μm) was cut into test pieces of 10 cm×10 cm. The laminated tape of the Examples 1 to 6 and Comparisons 1 to 11 were brought into contact with CPP-side of two pieces of the test pieces, which was press-sealed from both sides with a seal bar of 5 mm (width)×8 cm (length) to adhere the two films with the laminated tape.

[Evaluation]

The tape was held with both hands approximately at the center thereof and was unsealed to check the openability and open surface thereof. After unsealing, the unsealed surface was pressed with fingers and the re-sealed portion was cut orthogonally to the tape by the width of 15 mm, which was pulled by a push-pull scale (MX-500N manufactured by IMADA CO., LTD.) at an angle of 90° and the strength when the tape was peeled was measured. The first polyolefin layer is represented as A, the adhesive material layer is represented as B and the second polyolefin layer is represented as C.

TABLE 1

| | Openability and Appearance | Re-Adhesion Strength |
|---|---|---|
| Example 1 | Excellent openability Peeled at the interface between B and C and flat peeling surface | 4N/15 mm |
| Example 2 | Excellent openability Peeled at the interface between A and B and flat peeling surface | 4N/15 mm |
| Example 3 | Excellent openability Peeled at the interface between A and B and flat peeling surface | 4N/15 mm |
| Example 4 | Excellent openability Peeled at the interface between A and B and flat peeling surface | 4N/15 mm |
| Example 5 | Excellent openability Peeled at the interface between A and B and flat peeling surface | 4N/15 mm |
| Example 6 | Excellent openability Peeled at the interface between A and B and flat peeling surface | 4N/15 mm |
| Example 7 | Excellent openability Peeled at the interface between B and C and flat peeling surface | 4N/15 mm |
| Example 8 | Excellent openability Peeled at the interface between B and C and flat peeling surface | 4N/15 mm |
| Example 9 | Excellent openability Peeled at the interface between B and C and flat peeling surface | 4N/15 mm |
| Comparison 1 | Peeled between A and B and between B and c and no smooth openability Dirty peeling surface | 1N/15 mm |

TABLE 1-continued

| | Openability and Appearance | Re-Adhesion Strength |
|---|---|---|
| Comparison 2 | Peeled between A and B and between B and c and no smooth openability Dirty peeling surface | 1N/15 mm |
| Comparison 3 | Hard to open on account of high opening strength | Measurement sample not available |
| Comparison 4 | Hard to open on account of high opening strength | Measurement sample not available |
| Comparison 5 | Hard to open on account of high opening strength | Measurement sample not available |
| Comparison 6 | Hard to open on account of high opening strength | Measurement sample not available |
| Comparison 7 | Hard to open on account of high opening strength | Measurement sample not available |
| Comparison 8 | Hard to open on account of high opening strength | Measurement sample not available |
| Comparison 9 | Hard to open on account of high opening strength | Measurement sample not available |
| Comparison 10 | Hard to open on account of high opening strength | Measurement sample not available |
| Comparison 11 | Peeled between A and B and between B and c and no smooth openability Dirty peeling surface | 1N/15 mm |

The Example 1 is arranged in the same manner as the first embodiment, Examples 2 to 6 are arranged in the same manner as the second embodiment and Examples 7 to 9 are arranged in the same manner as the third embodiment. The tapes of these Examples could be split at a desired position and flat peeling surface could be obtained. Further, high re-adhesion strength can be obtained, so that an object of the invention can be achieved.

On the other hand, the tapes of Comparisons 1, 2 and 11 did not produce constant peeling position and were peeled on both sides. Accordingly, flat peeling surface could not be exhibited and only a small re-adhesion strength could be obtained. Since high opening strength was required in Comparisons 3 to 7, it was difficult to unseal the tape.

Test 2

Next, n-heptane migration test was conducted.

According to the standard of food sanitation law, if residue on evaporation is 30 ppm or less, the object can be applied to oily food sterilized at 100° C. or more. Further, if residue on evaporation is 150 ppm or less, the object can be applied to oily food sterilized at less than 100° C. If substance exceeding 150 ppm is extracted, the object cannot be used as package of oily food itself.

Example 10

The laminated tape was manufactured according to test 1. The used resins were as follows:

First polyolefin layer: F704NP, thickness 170 μm

Adhesive material layer: adhesive material of Example 1, thickness 20 μm

Second polyolefin layer: Y2045HP, thickness 15 μm

Incidentally, though the width of the cross section of the tape was 20 mm, the width of the adhesive material layer was set at 15 mm, which was surrounded by the first polyolefin layer and the second polyolefin layer.

According to the "test of apparatus or container package made of synthetic resin: Notification of Health and Welfare Ministry No. 370, 3-D-2, 1959", n-heptane migration test was conducted. Specifically, migration was tested for 2 ml of n-heptane per 1 cm$^2$ of the laminated tape at 25° C. for an hour.

The resulted residue on evaporation was 25 ppm, which was proved to be usable in a condition of 100° C. or more. Accordingly, since the laminated tape of the invention causes little migration of oil-soluble component, the laminated tape can be favorably used in terms of sanitation and safety.

The invention claimed is:

1. A laminated tape used for sealing a packaging body, comprising:
    an adhesive material layer;
    a first polyolefin layer laminated on a first side of the adhesive material layer; and
    a second polyolefin layer laminated on a second side of the adhesive material layer, the first and the second polyolefin layers being welded onto mutually opposing attachment portions of the packaging body, wherein
    the first polyolefin layer is made of polyolefin having higher crystallinity than the polyolefin of the second polyolefin layer,
    the adhesive material layer is in contact with the first polyolefin layer at a first contact surface and the adhesive layer is in contact with the second polyolefin layer at a second contact surfaces,
    the first contact surface defining an easy-peel layer being capable of peeled off more easily than the second contact surface, and
    the easy-peel layer is capable of being re-adhered after being peeled off.

2. The laminated tape according to claim 1, wherein
    the first and the second polyolefin layers are bonded at packaging-contents-side ends thereof or at ends on both sides, and
    the adhesive material layer is sandwiched between the first and the second polyolefin layers except for the bonded ends.

3. The laminated tape according to claim 1, wherein
    an adhesive material of the adhesive material layer comprises a rubber copolymer containing styrene block and diene block, tackifier resin and plasticizer.

4. The laminated tape according to claim 1, wherein
    a thickness of the first polyolefin layer is 30 μm or more and a thickness of the adhesive material layer and the second polyolefin layer is less than 30 μm.

5. The laminated tape according to claim 4, wherein
    the first polyolefin layer is made of homo-polypropylene or block-polypropylene and
    the second polyolefin layer is made of a random polypropylene or a blend resin of polypropylene and polyethylene.

6. The laminated tape according to claim 4, wherein
    the first polyolefin layer is made of high-density polyethylene and
    the second polyolefin layer is made of low-density polyethylene or linear polyethylene.

7. A packaging body, comprising:
    the laminated tape according to claim 1, the laminated tape being welded onto mutually opposing attachment portions.

8. The laminated tape according to claim 1, wherein
    at least one of the attachment portions is shorter than any of the adhesive layer, the first polyolefin layer and the second polyolefin layer, and is welded to be located approximately at the center of the laminated tape.

9. A manufacturing method of the laminated tape according to claim 1, comprising:
    a multilayer profiled co-extruding, in which polyolefin and adhesive material are co-extruded using a profiled die to form the first polyolefin layer, the adhesive material layer and the second polyolefin layer.

* * * * *